Patented Jan. 12, 1937

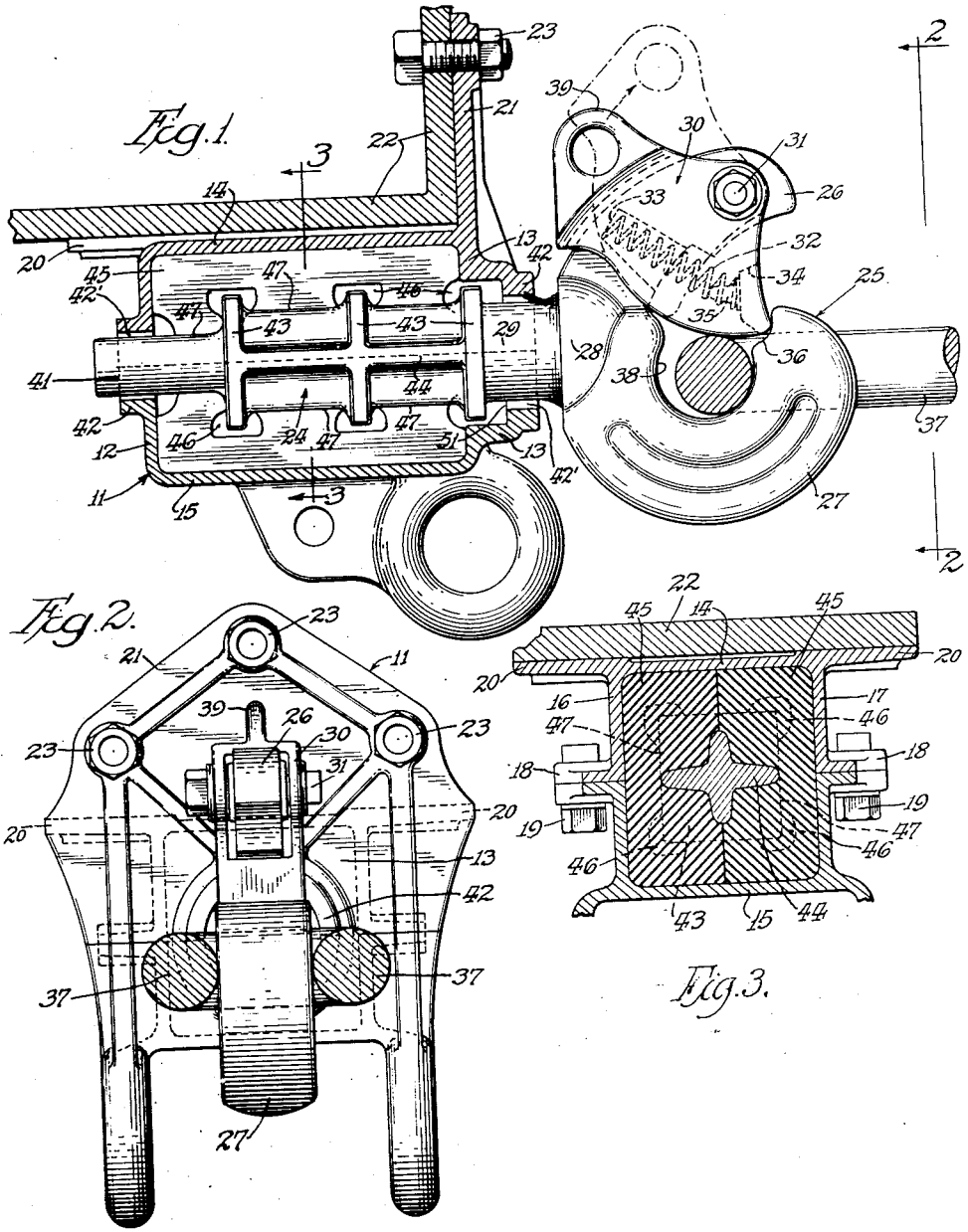

2,067,794

UNITED STATES PATENT OFFICE 2,067,794

COUPLER

Carl G. Seyferth, Muskegon, Mich., assignor to West Michigan Steel Foundry Co., Muskegon, Mich., a corporation of Michigan Application September 29, 1934, Serial No. 746,209

2 Claims. (Cl. 280—33.9)

This invention relates to coupling means between tractors and trailer vehicles.

A principal object of the invention is the provision, in a coupling or pintle hook connection between tractor and trailer, of a connecter member resiliently mounted for longitudinal movement with respect to the pull of said tractor or vehicle.

Another important object of the invention is the provision of a coupling means between tractor and trailer having a pintle hook and shaft resiliently cushioned and mounted in rubber blocks enclosed within a fixed housing, said pintle hook and shaft having substantial longitudinal movement held within extremes in either direction and providing a flexible coupling means for lessening the shock and strain on the coupling parts when starting or stopping under load.

Another important object of the invention is the provision of yieldable frictional contact means in a pintle hook type coupler, adapted to more efficiently couple the tractor vehicle and trailer together without any metal to metal frictional contact.

A still further object of the invention is the provision in a coupler of means for retaining the connecter member in locked or coupled position and adapted to manually release the same for unlocking or uncoupling.

Numerous other objects and advantages of the invention will be apparent as it is better understood from the following description, which, taken in connection with the accompanying drawing, discloses a preferred embodiment thereof.

On the drawing,

Figure 1 is a side elevation of a pintle hook showing the bearing and housing bracket in section;

Fig. 2 is a front elevation of Fig. 1 looking in the direction of the arrows 2—2; and Fig. 3 is a section taken substantially on the line 3—3 of Fig. 1.

Referring to the drawing reference character 11 indicates, generally, a housing, hollow and box-shaped, comprising end walls 12 and 13, top and bottom walls 14 and 15 and front and rear walls 16 and 17. The housing 11 is split centrally of the upper and lower portions 14 and 15 and is provided with lugs 18 on the portions 16 and 17 for the reception of bolts 19 which secure the sections together rigidly.

Horizontal extensions or lugs 20 forming a part of the top wall 14, and a vertical lug 21 forming an extension of the end wall 13, serve to rigidly secure the housing 11 to the end of a tractor or trailer body 22 by means of bolts 23, or in any other desired manner.

Centrally located within the box-like housing 11 is a pintle hook shaft, generally referred to by reference character 24 and formed beyond the end wall 13 into a pintle hook head member indicated by reference character 25. The pintle hook member 25 comprises an upper arcuate portion 26 and a lower circular portion 27, the two converging at 28 into a circular portion 29 on the shaft 24.

A yieldable closure 30 straddles the arcuate portion 26 and is adapted to pivot at 31 to the upper end of the arcuate portion 26. A spring 32 bears at one end against the end of an opening 33 in the portion 26 while at the other end it bears against a connecting lug 34 on the member 30 having a spring centering pin 35. The spring 32 normally urges that end of the closure 30 having the lug 34 against a shoulder 36 in the hook-shaped portion 27. In this position the closure member 30 prevents the withdrawal of a connecting link 37 which straddles member 27 and lies within the notch 38 of this member. It will be noted that in this position the parts are so arranged that the connecting link tends to maintain its locking position unless the closure is manually swung away from its normal locking position to release the connecting link.

A ring-shaped lug 39 is provided on the member 30 to enable it to be moved against the spring 32 into the broken line position shown in Fig. 1, in which position the connecting link 37 may be removed from the hook in order to detach the trailer from the tractor vehicle.

The shaft 24 has end bearing portions 41 and 29, the end 29 being joined to the head 27 of the pintle hook as already described. These end bearing portions 41 and 29 are adapted to be housed within hub or bearing portions 42 located in the end walls 12 and 13.

The bearings 42 are provided with openings 42' larger in diameter than the end portions 41 and 29 to provide clearance for these members in transverse direction with respect to their axis, which permits these portions to literally float in the housing 11.

Intermediate the end portions 41 and 29 the shaft is formed with a plurality of substantially square plates or disks 43 spaced apart from one another and joined together by rib portions 44 which are at right angles thereto, the shaft 24 and pintle head 25 being parts of the same unitary member.

Referring now to Fig. 3. A pair of rubber blocks 45 are adapted to fit snugly within the walls or confines of the housing 11 and are molded in such a manner as to also fit snugly around the ribs 44 of the shaft 24. A plurality of openings or voids 46 are provided at intervals in the inner part of each block 45 adjacent the outer corners of the disk portions 43 and at the end of the blocks surrounding portion 41 of the shaft 24 to form spaced abutments 47, as best seen in Fig. 1. These rubber blocks with their voids and spaced abutments constitute a cushioning anchorage for the shaft and the pintle head, the rubber being firm enough to offer resistance to the movement of the shaft 24, yet flexible enough to give under a load or strain.

Under instant starting and unusual load or strain, shaft 24 will tend to pull against the frictional engagement of the rubber blocks 45 and the material of the abutments 47 will be compressed and spread into the recesses or voids 46, thus insuring a free floating mounting between the shaft 24 and the housing 11. To prevent excessive movement, a shoulder 51 is provided in the end wall 13 against which the end disk 43 will bear to limit movement of the shaft in a rearward direction, while the portion 28 of the hook serves to limit this movement in the opposite direction.

It will be understood that under normal conditions the pintle hook shaft will float in its rubber mounting while the tractor and trailer are connected, and no wear on the shaft and very little appreciable wear on the rubber blocks will be encountered.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a coupling device, a housing, a member having a shank, the end portions of said shank extending through enlarged openings in said housing, the central portion of said shank disposed within said housing, cushioning means disposed in said housing in close contact with the walls thereof whereby said cushioning means is confined against bodily movement relative to said housing, said cushioning means surrounding said central portion of said shank in partially spaced relation thereto to permit floating movement of said member relative to said housing, and means on said shank cooperating with said cushioning means and said housing to limit floating motion of said member in all directions.

2. In a coupling device for vehicles, a housing, a coupling member having a shank, the end portions of which extend through enlarged openings in opposed faces of said housing and a central portion disposed within said housing and having spaced abutments thereon, cushioning means disposed in said housing in close contact with the walls thereof whereby said cushioning means is confined against bodily movement relative to said housing, said cushioning means surrounding said central portion of said coupling member in partially spaced relation thereto to permit floating movement of said coupling member relative to said housing, said end portions and abutments cooperating with said housing and cushioning means to limit floating movements of said coupling member in all directions.

CARL G. SEYFERTH.